United States Patent [19]

Wilson

[11] 4,420,922
[45] Dec. 20, 1983

[54] STRUCTURAL SECTION FOR CONTAINING A VACUUM

[76] Inventor: Pryce Wilson, 2202 N. 38th St., Phoenix, Ariz. 85008

[21] Appl. No.: 217,770

[22] Filed: Dec. 18, 1980

[51] Int. Cl.³ .................................................. E04C 2/34
[52] U.S. Cl. .......................................... 52/791; 52/793; 52/802; 52/809
[58] Field of Search ............... 52/791, 793, 809, 810, 52/796, 797, 802, 807; 428/178

[56] References Cited

U.S. PATENT DOCUMENTS

| | | |
|---|---|---|
| 698,453 | 4/1902 | De'Clairmont . |
| 958,095 | 5/1910 | Coleman .................... 52/791 X |
| 1,229,912 | 6/1917 | Doncaster . |
| 1,328,918 | 1/1920 | Fulda ............................ 52/793 |
| 1,337,611 | 4/1920 | Mendenhall . |
| 1,433,894 | 10/1922 | Klein . |
| 1,890,655 | 12/1932 | O'Leary . |
| 1,948,477 | 2/1934 | Zenner ........................ 220/15 |
| 1,954,581 | 4/1934 | Wortmann .................... 220/14 |
| 1,984,007 | 12/1934 | Babitt ........................... 52/791 |
| 2,189,388 | 2/1940 | Zand ........................... 20/56.5 |
| 2,559,198 | 7/1951 | Ogden ........................ 257/124 |
| 2,638,187 | 5/1953 | Tate ............................ 52/802 |
| 2,700,632 | 1/1955 | Ackerlind ................... 154/110 |
| 2,718,014 | 9/1955 | Mizrach et al. ................ 4/177 |
| 2,849,758 | 9/1958 | Plumley et al. ................ 20/15 |
| 3,108,367 | 10/1963 | Christman ................... 29/430 |
| 3,226,905 | 1/1966 | Richardson et al. ............ 52/666 |
| 3,227,620 | 10/1966 | Martin .......................... 52/82 |
| 3,242,629 | 3/1966 | Mandelbaum ................ 52/615 |
| 3,803,784 | 4/1974 | Becker ........................ 52/173 |
| 3,858,372 | 1/1975 | Wilson .......................... 52/81 |
| 4,253,445 | 3/1981 | Wilson ........................ 126/422 |

FOREIGN PATENT DOCUMENTS

| | | |
|---|---|---|
| 1011072 | 5/1977 | Canada . |
| 2802411 | 7/1979 | Fed. Rep. of Germany . |
| 2827818 | 1/1980 | Fed. Rep. of Germany ........ 52/791 |
| 548041 | 9/1956 | Italy ............................ 52/793 |
| 20731 | of 1911 | United Kingdom . |
| 1138992 | 12/1965 | United Kingdom . |

*Primary Examiner*—Carl D. Friedman
*Attorney, Agent, or Firm*—Warren F. B. Lindsley

[57] ABSTRACT

Structural sections comprising two spaced apart parts defining an intervening evacuatable void, the parts affording a high degree of thermal and acoustical insulation due in part to the vacuum but also to the minimal contact between the two parts. The parts are held apart against atmospheric pressure through the use of line or point contact formed in a particular manner to minimize thermal and acoustical conduction at the contacting surfaces.

7 Claims, 16 Drawing Figures

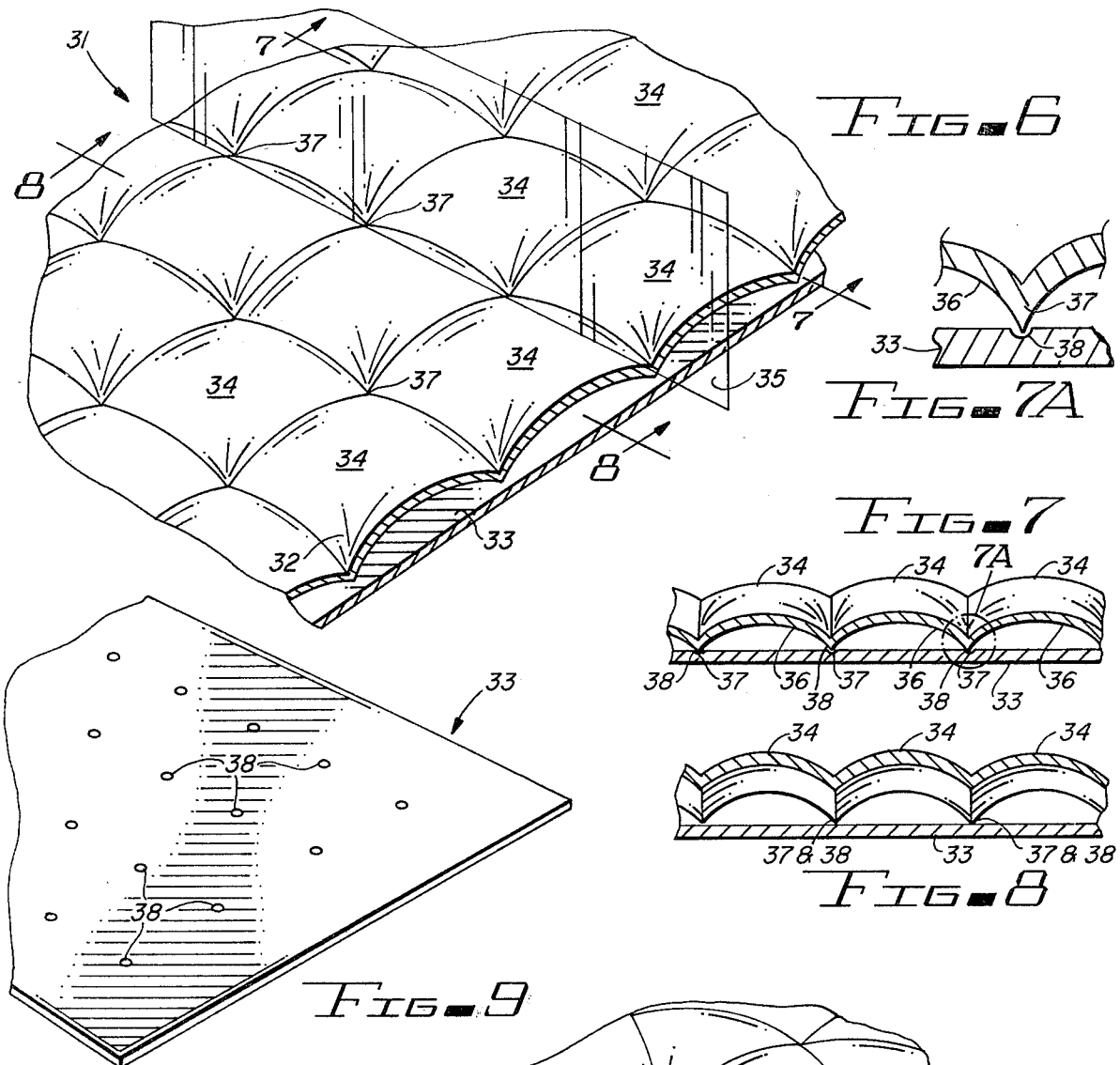
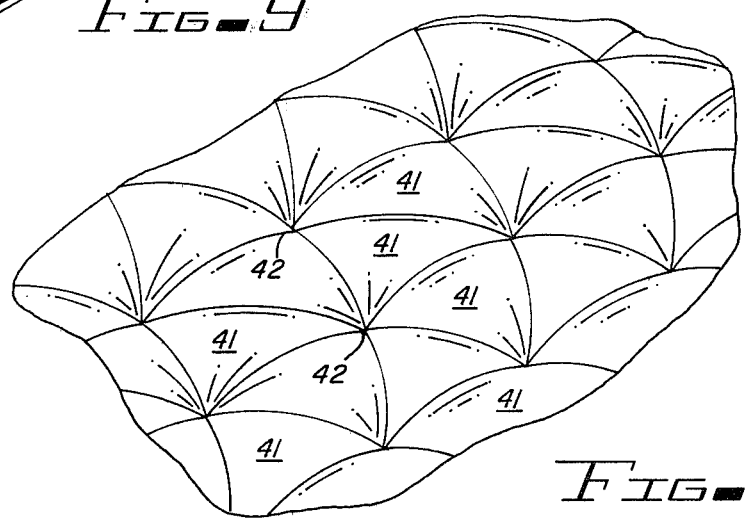

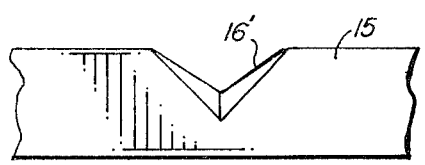
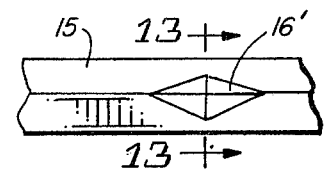
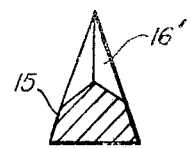
FIG.11  FIG.12  FIG.13
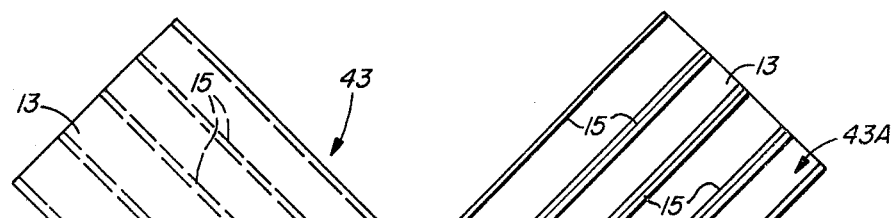
FIG.14
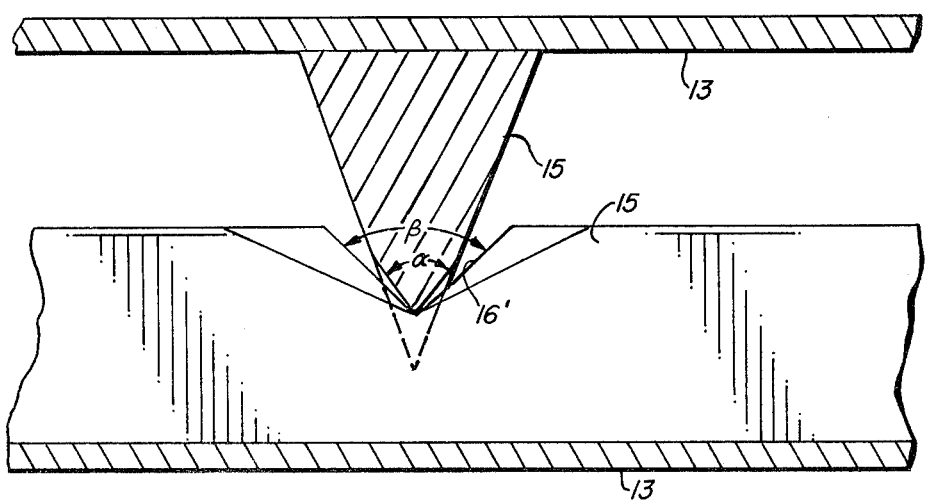
FIG.15

STRUCTURAL SECTION FOR CONTAINING A VACUUM

BACKGROUND OF THE INVENTION

The increasingly high cost of fuel and energy offers a significant incentive for the development of building materials with improved insulating characteristics. Because building materials are also becoming increasingly expensive, it is important that such improvements should be provided through the utilization of technicques requiring a minimum of material content relative to the degree of insulation provided.

In the process of providing such structural segments or sections, it is also important to take into account other essential characteristics of a good structural element such as the mechanical bonding strength of the sections, as well as their isolation, preservative and acoustical characteristics.

Recent advances in materials and fabrication permit the economical production of evacuated structural panels, segments or sections that will meet such important needs and requirements.

DESCRIPTION OF THE PRIOR ART

Although vacuum, rated in various degrees of Torr, has been used to insulate articles including the walls of buildings, the insulating benefits of the vacuum have been greatly reduced by the supporting structure between the walls which forms conductive energy flow paths therebetween.

Applicant has disclosed and claimed in the following co-pending applications various vacuum encased articles and buildings related to the features claimed herein:

Ser. No. 869,832; filed Jan. 16, 1978; MULTI-WALLED STRUCTURES FOR CONTROLLED ENVIRONMENTAL USE; now under appeal in the U.S. Patent and Trademark Office.

Ser. No. 31,467; filed Apr. 19, 1979; CONCENTRATING VACUUM INSULATED SOLAR ENERGY COLLECTION U.S. Pat. No. 4,253,445; now allowed.

Ser. No. 92,740; filed Nov. 9, 1979; CONCENTRATING VACUUM ISOLATED SOLAR ENERGY COLLECTION APPARATUS EMPLOYING REFLECTOR now U.S. Pat. No. 4,281,637.

Although a number of the following patents disclose spaced evacuated walls for articles and buildings and U.S. Pat. No. 1,948,477 particularly illustrates triangular spacers extending between the walls, none of these patent configurations disclose applicant's claimed interlocking spacers forming limiting point on a line contact therebetween.

U.S. Pat. Nos. 698,453; 1,229,912; 1,337,611; 1,433,894; 1,890,655; 1,948,477; 1,954,581; 2,189,388; 2,559,198; 2,700,632; 2,718,014; 2,849,758; 3,108,367; 3,226,905; 3,242,629; 3,227,620; 3,803,284; 3,858,372.
British Pat. Nos. 20,731; 1,138,992.
Canadian Pat. No. 1,011,072.
German Pat. No. 2,802,411.

SUMMARY OF THE INVENTION

In accordance with the invention claimed, an improved structural element is provided in the form of an evacuated section, segment or double wall panel with minimal surface contact between juxtapositioned parts or panel walls of the section.

It is, therefore, one object of the present invention to provide an improved structural section for wall, ceiling or floor use in building construction.

Another object of this invention is to provide such a panel, segment or section in a form that utilizes the insulating property of a vacuum to provide improved thermal, acoustical, bonding and preservative characteristics.

A further object of this invention is to provide such a section in a form that is highly efficient in its realization of the benefits of a vacuum, such efficiency being provided through the minimization of surface contact between juxtapositioned walls of a double wall configuration.

A still further object of this invention is to provide a high degree of mechanical strength in the structural section disclosed through the utilization of construction features and geometrics that are ideally suited to the application.

A still further object of this invention is to provide such an improved wall panel or section in a form that minimizes the required material content.

A still further object of this invention is to provide such a panel or structural section in a form that is inexpensive and easy to produce.

Yet another object of this invention is to provide such a panel or structural section in a form that may utilize a dead-air space in place of the vacuum to achieve thermal and acoustical characteristics approaching those of an evacuated panel or structural section.

A still further object of this invention is to provide a structure section formed of metal or concrete and embodying the features of this invention.

A still further object of this invention is to provide such a panel or wall section in a form that utilizes a point on a line contact to secure and position the panels or sections oppositely and adjoinly to each other.

A still further object of this invention is to provide such a panel or section in a form that may utilize the space therebetween to contain liquid or air pressure in place of a vacuum to quickly achieve further control of energy transfer through the panel or section.

A still further object of this invention is to provide such a panel or structural section in a form that achieves structurally improved rigidity in an improved manner by cross framing.

A still further object of this invention is to provide such a panel or structural section which is structurally improved by negative compression.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 6 is a perspective view of a portion of a further variation of the evacuated panel or structural section of the invention utilizing for one of the two walls of the section a surface formed by intersecting spheres;

FIG. 7 is a cross-sectional view of the panel or structural section of FIG. 6 as seen along line 7—7 thereof;

FIG. 7A is an enlargement of the circled area of FIG. 7 showing the parts slightly separated for clarity sake;

FIG. 8 is a cross-sectional view of the panel or structural section shown in FIG. 6 taken along the line 8—8 thereof;

FIG. 9 is a perspective view of a dimpled flat plate utilized as one of the two walls of the structure shown in FIG. 6;

FIG. 10 is a perspective view of the surface of yet another variation of the evacuated panel or structural section of the invention;

FIG. 11 is a side view of one of the ribs shown in the lower plate of FIG. 1 showing a modification of the notch configuration;

FIG. 12 is a top view of FIG. 11;

FIG. 13 is a cross-sectional view of FIG. 12 taken along the line 13—13;

FIG. 14 is a top view of a plurality of interlocking and meshing sections embodying the rib and notch configuration shown in FIGS. 1-13; and FIG. 15 is an enlarged cross-sectional view of an interlocking plate and rib configuration more clearly illustrating the point on line engagement of interlocking ribs each employing a notch configuration of FIGS. 11-13 at the point of engagement.

DESCRIPTION OF THE PREFERRED EMBODIMENT

Figure 1:
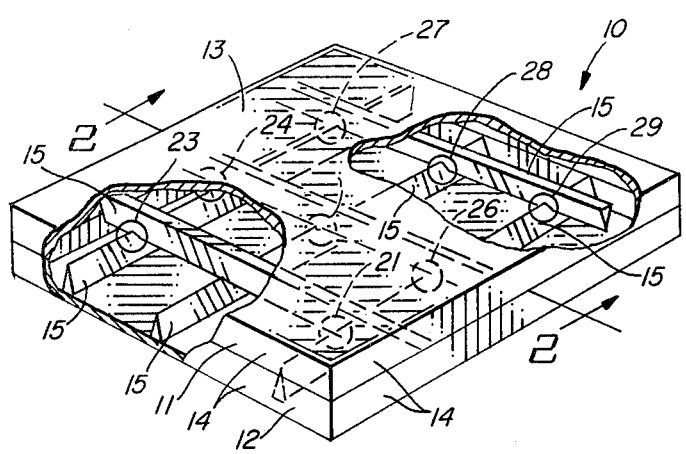
FIG. 1 is a perspective view of an improved evacuated wall panel or structural section embodying the invention with surface walls partially cut away to reveal details of its interior construction.

Referring more particularly to the drawings by characters of reference, FIGS. 1-4 disclose an improved evacuated panel or structural section 10 comprising front and rear parts or walls 11 and 12, respectively.

Each of walls 11 and 12 comprise a flat rectangular face plate 13 surrounded by four perpendicularly extending edge members 14 and reinforced by a number of equally spaced spacer members or parallelly positioned ribs 15. The walls 14, together with plate 13, form a shallow open tray. In FIGS. 1-4, each of the three parallelly spaced ribs 15 has a triangular or wedge shaped cross-sectional configuration.

Figure 3:
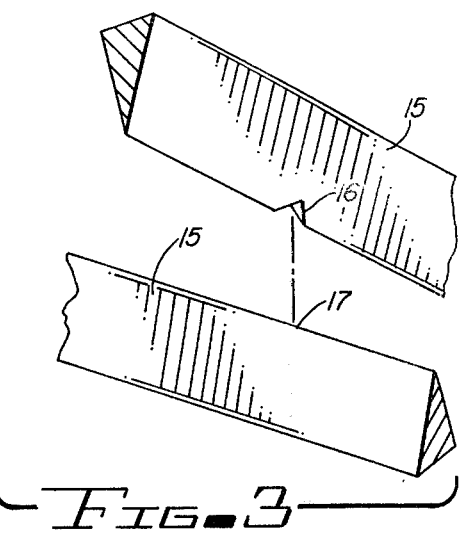
FIG. 3 is an enlarged detailed view of the two intersecting spacers incorporated in the panel or structural section shown in FIG. 1.

In the assembly of structural section 10, walls 11 and 12 are placed one against the other, their open sides being juxtapositioned with ribs 15 of wall 11 oriented perpendicularly to ribs 15 of wall 12. At each of the intersections of ribs 15 of wall 11 with ribs 15 of wall 12, one of the ribs is notched as shown in FIGS. 2 and 3, the notch 16 of one rib being aligned with the intersecting edge 17 of another perpendicularly positioned rib 15.

One of the ribs 15 is notched at each intersection of it with another rib, the notch 16 appearing at alternate intersections along the length of a given rib 15. In the structure shown in FIG. 1, the three ribs 15 of wall 11 intersect at nine positions with the three ribs 15 of wall 12, the intersections being identified by the reference characters 21-29. At the odd-numbered intersections 21, 23, 25, 27 and 29, notches 16 are provided in ribs 15 of wall 12 while at the even-numbered intersections 22, 24, 26 and 28, notches 16 are provided in ribs 15 of wall 11.

Figure 2:
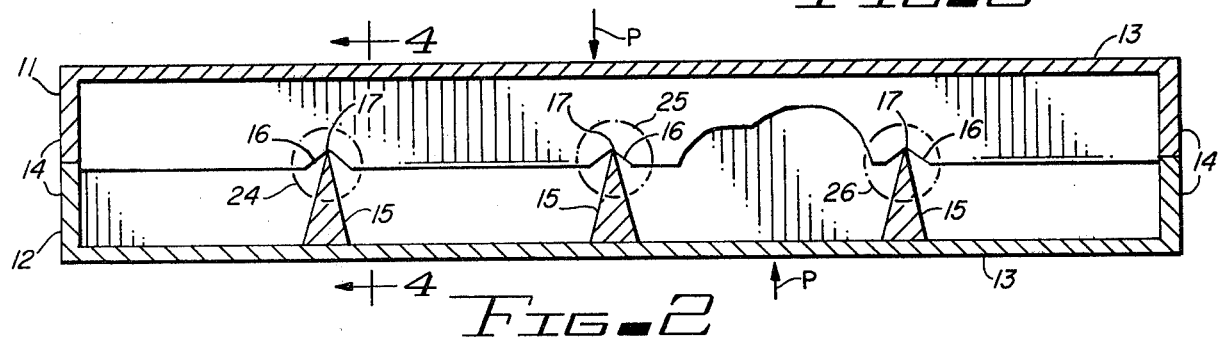
FIG. 2 is a cross-sectional view of FIG. 1 as seen along line 2—2 thereof.
Figure 4:
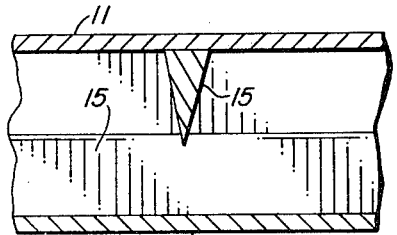
FIG. 4 is a cross-sectional view of FIG. 2 taken along the line 4—4.

As shown more clearly in FIG. 2, ribs 15 have a sharper or smaller angle at their apex or projecting edge formed by anticline plane than the angle of notch 16 formed by the converging sides of synclinal lines of the engaging rib so that the only contact between rib 15 and notch 16 is at the edge 17 of the rib which bears against the aligned root or base line of notch 16. Contact between the intersecting ribs 15 thus is in the form of a point on a line contact rather than a flat surface contact. This is true if the angle of the notch is greater than the angle formed by the anticline formed by the sides of rib 15. The merit of such a point-line contact in this construction is that it provides a very limited path for thermal conduction between the intersecting ribs 15 and hence between the opposing walls 11 and 12.

It will be recognized that from a mechanical standpoint, contact in some registering form is desirable between the ribs 15 of wall 11 and ribs 15 of wall 12, such contact being utilized to align the engaging parts of the structural section and to counteract atmospheric pressure P which bears against the walls 11 and 12 when the interior of panel 10 is evacuated. When ribs 15 of walls 11 and 12 are in contact, as described, the ribs 15 maintain a uniform spacing between plates 13 of walls 11 and 12. The stiffening and spacing actions of ribs 15 permit the utilization of a thinner plate 13 and a lower material content than would otherwise be possible, while assuring that the plates 13 will not deform under atmospheric pressure P.

The edge members 14 surrounding plates 13 of each of the walls 11 and 12 are of sufficient height that their edges bear against each other to close off completely the interior of panel 10. In the final assembly of wall 10, these edges may be cemented together to achieve an airtight enclosure for evacuation purposes.

The notched intersections 21-29 serve also to register and secure the relative position of walls 11 and 12. The notches 16 in ribs 15 of wall 11 prevent displacement along the lengths of these ribs while notches 16 of wall 12 prevent displacement along the length of the ribs of wall 12.

The construction of structural section 10 is such that all interior spaces are in communication with each other. A common interior space is thus provided that is sealed off from the atmosphere so that evacuation may be readily accomplished.

Each of the walls may be assembled using flat sheet materials of any suitable material such as wood, plastic, steel or concrete, for plates 13 and edges 14. The ribs may be cut from thicker stock or they may be molded. Alternatively, the entire wall 11 or 12 may be molded as a single part. Fiberglass or a suitable plastic or epoxy bonded material is one particular type of material which may be employed, the essential characteristics including good impervious properties and mechanical strength.

Figure 5:
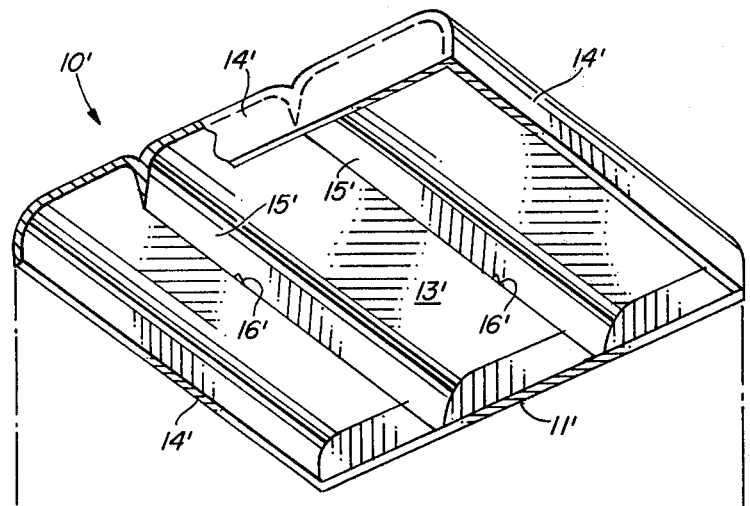
FIG. 5 is an exploded perspective view of two mating molded wall sections that are placed one against the other to form a second embodiment of the invention.

A variation of structural section 10 is shown as section 10' in FIG. 5. This section is similar to section 10, its differences being directed toward the facilitation of forming or molding its walls 11' and 12' as one piece parts in which ribs 15', edge members 14' and plates 13' are molded as an integral structure. In FIG. 5, wall 11' is separated from wall 12' to show their interiors. It should be noted that notches 16' are alternately positioned between ribs 15' of wall 11' and ribs 15' of walls 12'.

The principles of the invention are not limited to the embodiments of FIGS. 1-5 but are applicable to further variations, some of which are shown in FIGS. 6-10.

In the embodiment of FIGS. 6-9, a double walled section 31 is illustrated comprising a front wall 32 and a rear wall 33.

The front wall 32 is formed by a plurality of spherical surfaces 34 intersecting along two sets of plane surfaces. In each set, the plane surfaces are parallel with each other and are uniformly spaced apart. The two sets of parallel planes are mutually perpendicular so that the individual spherical surfaces 34 are in the form of spherical rectangles or squares.

The cross-sectional view of FIG. 7 is taken at a plane of intersection 35. It will be noted that the adjacent convex spherical surfaces intersect to form an arch 36 comprising the arc of a circle with a radius that is smaller than the radius of the spherical surface 34. At each common point between four adjacent surfaces 34, a valley point 37 is formed which serves as a point of contact between the spherically formed front wall 32 and the rear wall 33.

The rear wall 33, as shown in FIG. 9, is a generally plane surface or flat sheet. Optional depressions or dimples 38 may be provided as locators for the valley points 37 of front wall 32. When the front wall 32 is positioned against the rear wall 33, each of the points 37 rests in a corresponding dimple 38. A suitable cement may be applied at each such point of contact between walls 32 and 33 to secure the two walls together for the formation of panel or structural section 31.

The sperhical surfaces 34 afford a maximum degree of mechanical strength for the support of atmospheric pressure on its exterior when the interior of section 31 is evacuated and further offers a very limited conductive energy flow path between the walls of the section. This feature, together with the decorative surfaces of the intersecting spheres, provides a new and energy effective building component.

Other patterns of intersecting spherical surfaces may be employed such as the surface shown in FIG. 10 wherein the individual surfaces 41 take the shape of a spherical triangle. Valley points 42 are again formed at the intersections of the intersecting planes.

The spherically formed surfaces of FIGS. 6 and 10 may be readily formed in presses or molds at reasonable cost.

In yet another variation of the invention, identical front and rear walls of the type shown in FIG. 6 or 10 may be employed. In this variation, the two identical walls are positioned one against the other with the contact or valley points 37 of the two walls facing each other. Both walls are thus afforded the structural strength of the spherical surfaces and the thickness of the vacuum chamber is doubled.

It will be recognized that in any of the embodiments of the invention, the vacuum chamber may be employed as a dead air space, liquid filled space or a space containing air under pressure. The thermal insulating capability of the sections employing a dead air space, liquid filled space or one under air pressure above atmospheric pressure, however, will be substantially reduced relative to the insulating capabilities of a section employing a vacuum.

FIGS. 11-13 illustrate a modification of the notch configuration shown in FIGS. 1-10 wherein notch 16' comprises four planar anticline planes forming a point in the center of the notch below the surface of the apex of the rib but above the lower most cut of each anticline plane into the surface of the rib as shown in FIGS. 1-13.

When a similar notch is provided in the opposed rib at their points of engagement the engagement of the ribs in notch-to-notch configuration is shown in FIG. 15. As shown, the alpha angle of the notch configuration in the upper rib is greater than the beta angle of the notch configuration in the lower rib.

FIG. 14 diagrammatically discloses how three or more opposing partial sections 43 and 43A may be secured in an overlapping manner with other partial sections to provide a continuing structural section. As disclosed above, the ribs 15 of each of the partial sections register with the ribs of the other partial sections to form a structural part of the building. As shown in FIG. 1, the total structural part is provided with side walls and edge members, not shown in FIG. 14, so as to provide a hollow closed interior which may be at least partially evacuated to provide the benefits of this invention.

A practical and effective structural panel is thus provided in accordance with the stated objects of the invention and although but a few embodiments of the invention have been illustrated and described, it will be apparent to those skilled in the art that various changes and modifications may be made therein without departing from the spirit of the invention or from the scope of the appended claims.

What is claimed is:

1. A structural section comprising:
a pair of engaging parts, each having a confronting edge which together form walls for encompassing and sealing a space therebetween containing less than surrounding atmospheric pressure,
means for positioning said parts, one relative to the other, comprising at least a pair of spacer members,
each one of said members of said pair of spacer members extending into the interior of said space from a different one of said parts for engaging the other one of said spacer elements laterally thereof at least at point contacts along a line,
said spacer members comprising elongated triangular configurations with each member having its base secured to the interior of a different one of said parts,
each of said spacer members engaging the other laterally thereof at its apex,
one of said engaging spacer members being notched for positioning the engaging members relative to each other, and
the angle defined by the notch being greater than the angle defined by the converging sides forming the apex of engaging spacer members.

2. The structural section set forth in claim 1 wherein: a plurality of pairs of spacer members are provided in a spaced arrangement in said space.

3. The structural section set forth in claim 2 wherein: like members of each pair of spacer members are set forth in a parallel arrangement.

4. The structural section set forth in claim 1 wherein: said parts define exposed planar surfaces.

5. The structural section set forth in claim 1 wherein: said spacer elements engage each other at least at a point in the valley of the notch of the other spacer element.

6. A structural section comprising:
a pair of engaging parts, each having a confronting edge which together form walls for encompassing and sealing a space therebetween containing less than surrounding atmospheric pressure, means for positioning said parts, one relative to the other, comprising at least a pair of spacer members, each one of said members of said pair of spacer members extending into the interior of said space from a different one of said parts for engaging the other one of said spacer elements laterally thereof at least at point contacts along a line, one of said engaging spacer members being notched for positioning the engaging members relative to each other, and at least one of said parts defining an exposed surface formed by a plurality of similar convex surfaces arranged in a planar array with their edges intersecting along similar pairs of mutually perpendicular planes.

7. A structural section comprising:

a pair of engaging parts, each having a confronting edge which together form walls for encompassing and sealing a space therebetween containing less than surrounding atmospheric pressure, means for positioning said parts, one relative to the other, comprising at least a pair of spacer members, each one of said pair of spacer members extending into the interior of said space from a different one of said parts for engaging the other one of said spacer elements laterally thereof at least at point contacts along a line, one of said engaging members being notched for positioning the engaging members relative to each other, each of said parts defining an exposed surface formed by a plurality of similar convex surfaces arranged in a planar array with their edges intersecting along similar pairs of mutually perpendicular planes, and said spacer members comprising the edges of said convex surfaces.

* * * * *